United States Patent [19]

Otto et al.

[11] Patent Number: 4,598,633
[45] Date of Patent: Jul. 8, 1986

[54] TREATMENT BOOTH

[75] Inventors: Eberhard Otto, Ludwigsburg; Rolf Mutschelknaus, Leonberg; Andreas Hauptmann, Kernen, all of Fed. Rep. of Germany

[73] Assignee: Durr Anlagenbau GmbH, Stuttgart, Fed. Rep. of Germany

[21] Appl. No.: 757,767

[22] Filed: Jul. 23, 1985

Related U.S. Application Data

[63] Continuation of Ser. No. 576,125, Feb. 2, 1984, abandoned.

[30] Foreign Application Priority Data

Feb. 2, 1983 [DE] Fed. Rep. of Germany ....... 3303338

[51] Int. Cl.⁴ ............................................. B05B 15/12
[52] U.S. Cl. ..................................... 98/115.2; 55/241; 55/276; 55/DIG. 46; 261/112; 261/DIG. 54
[58] Field of Search ......... 55/240, 241, 276, DIG. 46; 98/115.2; 118/326, DIG. 7; 261/62, 104, 112, DIG. 54

[56] References Cited

U.S. PATENT DOCUMENTS

| | | | |
|---|---|---|---|
| 3,168,030 | 2/1965 | Wilhelmsson et al. | 98/115 SB |
| 3,170,384 | 2/1965 | Krantz et al. | 98/115 SB X |
| 3,391,630 | 7/1968 | Wilhelmsson et al. | 98/115 SB X |
| 4,350,506 | 9/1982 | Otto | 98/115 SB X |
| 4,398,452 | 8/1983 | Bradshaw | 98/115 SB |
| 4,440,554 | 4/1984 | Perry | 261/112 X |

FOREIGN PATENT DOCUMENTS

| | | |
|---|---|---|
| 1214370 | 4/1966 | Fed. Rep. of Germany . |
| 1427597 | 6/1976 | Fed. Rep. of Germany . |
| 359455 | 9/1973 | Sweden . |

Primary Examiner—Harold Joyce
Attorney, Agent, or Firm—Pahl, Lorusso & Loud

[57] ABSTRACT

A spray booth has an intermediate grating type floor (20) through which air is circulated. The air passes through a cleaning liquid nozzle (A) and entrains and atomises cleaning liquid derived from an overflow trough (30) with weirs (46,48). A spent air channel (24) is enclosed by a cover (28) located at least 20 cm from a flow off edge (28a) of the cover. The cover may itself form part of the washing-liquid feed device. A guide channel leads from weir (40) to the upper edge of a slot (34) forming the orifice of liquid nozzle (A). The cover (28) shields the working area of the booth from the noise generated by the nozzle (A).

6 Claims, 4 Drawing Figures

TREATMENT BOOTH

This is a continuation of application Ser. No. 576,125, filed Feb. 2, 1984 now abandoned.

The invention relates to a treatment booth, such as a spray booth. The invention is concerned with a treatment booth comprising a working space bounded by a first intermediate perforate floor underneath which is located at least one intermediate wall which forms a further intermediate floor and which adjoins a washing-liquid feed device located adjacent the further intermediate floor such that the booth can be rinsed with washing fluid by said liquid, and comprising a flow-off edge on said device on its side facing away from the washing-liquid feed device, and a washing-out device for washing out particles or other impurities from the spent air extracted from the working space through the first intermediate floor, the washing-out device having a slit-shaped nozzle orifice which extends aproximately horizontally and which is limited by an upper edge and a lower edge both of which can be fed with washing liquid.

Such spray booths with so-called horizontal or flat washing-out are known, for example, from German Auslegeschrift No. 1,427,597. The spray booth described here possesses, under an intermediate floor, which is formed by a grating, on which the workers stand, two intermediate walls which are inclined relative to the horizontal and, as seen in the longitudinal direction of the treatment booth, are arranged approximately in the form of a low-angled V. The walls descend from washing-fluid feed devices extending along the longitudinal edges of the treatment booth, each in the form of an overflow trough, towards the longitudinal centre plane of the booth and are limited at the bottom by flow-off edges forming the upper and lower edges of the nozzle orifice. Located under these intermediate walls arranged in the form of a V is a pool of washing liquid extending to a position under a spent-air stack located next to the treatment booth through which the spent air from the booth is extracted. At the flow-off edges, limiting the nozzle orifice, of the two intermediate walls, the washing liquid running down these walls is atomised and behind the nozzle orifice is swirled intensively, in an expansion chamber located between the latter and the spent-air stack, with the spent air extracted from the working space above the grating. This results in the desired washing-out effect. In this known spray booth, the expansion chamber is located under one inclined intermediate wall and above the pool of washing liquid. Disadvantages are, firstly, that accumulations of paint or other impurities, which considerably impair the efficiency of the washing-out device, can form unnoticed in the region underneath the intermediate wall, thus limiting the expansion chamber at the top which cannot be seen from the working space and is accessible only with great difficulty. Secondly, the noise level in the working space of spray booths of this type is relatively high: the greatest source of noise in such a spray booth is the nozzle orifice which, in the known construction, is located under the grating floor limiting the working space at the bottom.

An object of this invention is to provide a treatment booth, especially a spray booth, with so-called horizontal or flat washing-out of the spent air, in the working space, in which the noise level is lower than in the known spray both described, without the efficiency of the washing out device being impaired.

In accordance with the present invention, the washing-out device forms, undeneath or below the level of the first intermediate floor, a spent-air channel which extends approximately horizontally and which ends at the nozzle orifice, which is covered in the direction of the working space by a cover and which is at a horizontal distance of at least 20 cm from the flow-off edge of the lower intermediate wall. Although, in the construction according to the invention, the actual noise source, namely the nozzle orifice of the washing-out device, is therefore covered when seen from the direction of the working space, so that persons working in the treatment booth are not exposed to such a great noise nuisance, it is ensured that washing liquid is supplied to the edges limiting the nozzle orifice, not only to spray sufficient liquid, but also to prevent accumulations of impurities at the nozzle orifice and consequently to prevent the efficiency of the washing-out device from being impaired. The object of the invention has hitherto not been achieved in spray booths with so-called horizontal or flat washing-out. Spray booths of this type have assumed considerable importance since they do not require any basement in the building accommodating the treatment booth, as is the case in treatment booths with so-called vertical washing-out. In the vertical washing-out booths the spent air from the booth is not extracted towards the side, but towards the bottom, so that the washing-out device requires a considerable overall height underneath the working space. In contrast to the known arrangement, the nozzle orifice is not followed in the direction of flow by an expansion chamber extending downwardly into a pool of washing fluid in which impurities can accumulate, so that they impair the efficiency of the washing-out device, since according to a further feature of the invention the pool of washing fluid is replaced in the expansion chamber by a drained surface which preferably has a descending gradient in the direction of flow.

Although an intermediate floor was mentioned above, this does not extend over the entire floor area of the working space. Moreover, the fact that the spent-air channel of the washing-out device is located underneath this intermediate floor is only an indication of relative height and does not mean that the spent-air channel is necessarily located completely or partially under the intermediate wall, as seen in a plan view, since the nozzle orifice can also be covered, for example, by the washing-fluid feed device. However, the cover of the nozzle orifice may, optionally be formed by the intermediate floor.

Preferably the mounting fluid feed device is in the form of an overflow trough adjoining the intermediate wall.

In an especially simple preferred arrangement a washing-fluid guide channel extending from the washing-fluid feed device, that is to say, in particular, the overflow trough, to the upper edge of the nozzle orifice, is provided for feeding washing fluid to the upper edge of the nozzle orifice. This is recommended especially when the nozzle orifice is located immediately underneath the overflow trough or is offset laterally only slightly in relation to this. However, if the nozzle orifice is located nearer to the flow-off edge of the intermediate wall, the preferred arrangement is one in which a washing-fluid guide channel leads from the flow-off edge of the intermediate wall to the upper edge of the nozzle orifice.

The lower surface of the spent-air channel can be defined by a pool of washing fluid, via which one nozzle-orifice edge is then also supplied with washing fluid. However, when the horizontal distance between the nozzle orifice and the flow-off edge of the intermediate wall is considerably greater than 20 cm, it is recommended to provide for the spent-air channel a bottom which is inclined in the direction of flow and is rinsed with washing fluid, but drained, in order to prevent the possibility of deposits building up in a relatively long space which is covered at the top and is therefore accessible only with difficulty. In such a design of the treatment booth, the washing fluid, running down via the intermediate wall, can also be utilised to feed the lower edge of the nozzle orifice with washing fluid, by arranging the flow-off edge of the intermediate wall above the bottom of the spent-air channel in such a way that washing fluid running off from the flow-off edge passes onto the bottom of the spent-air channel. In view of the fact that the washing fluid running off from the flow-off edge is carried along by the air flow, it is not necessary for the flow-off edge to be located exactly above the bottom of the spent-air channel, as seen in the vertical direction.

To keep impurities floating in the overflow trough away from the nozzle orifice as far as possible, that overflow edge of the overflow trough from which a washing-fluid guide channel leads to the nozzle orifice should preferably be made serrated or corrugated. Furthermore, these overflow edges may also be subdivided into individual portions and be vertically adjustable individually, so that the supply of washing fluid to the nozzle orifice and/or to the intermediate wall located above the spent-air channel can be controlled.

Finally, according to a further feature of the invention, the nozzle orifice may adjoin an accessible expansion chamber, so that the region located behind the nozzle orifice in the direction of flow can be cleaned easily.

The treatment booth may have a single washing-out device according to the invention, so that the spent air from the booth is extracted towards one side only. Alternatively a spent-air channel may be provided with an intermediate wall and a nozzle orifice on each of the two sides of the vertical longitudinal centre plane of the booth.

The invention is illustrated, merely by way of example, in the accompanying drawings, in which.

Figure 1:
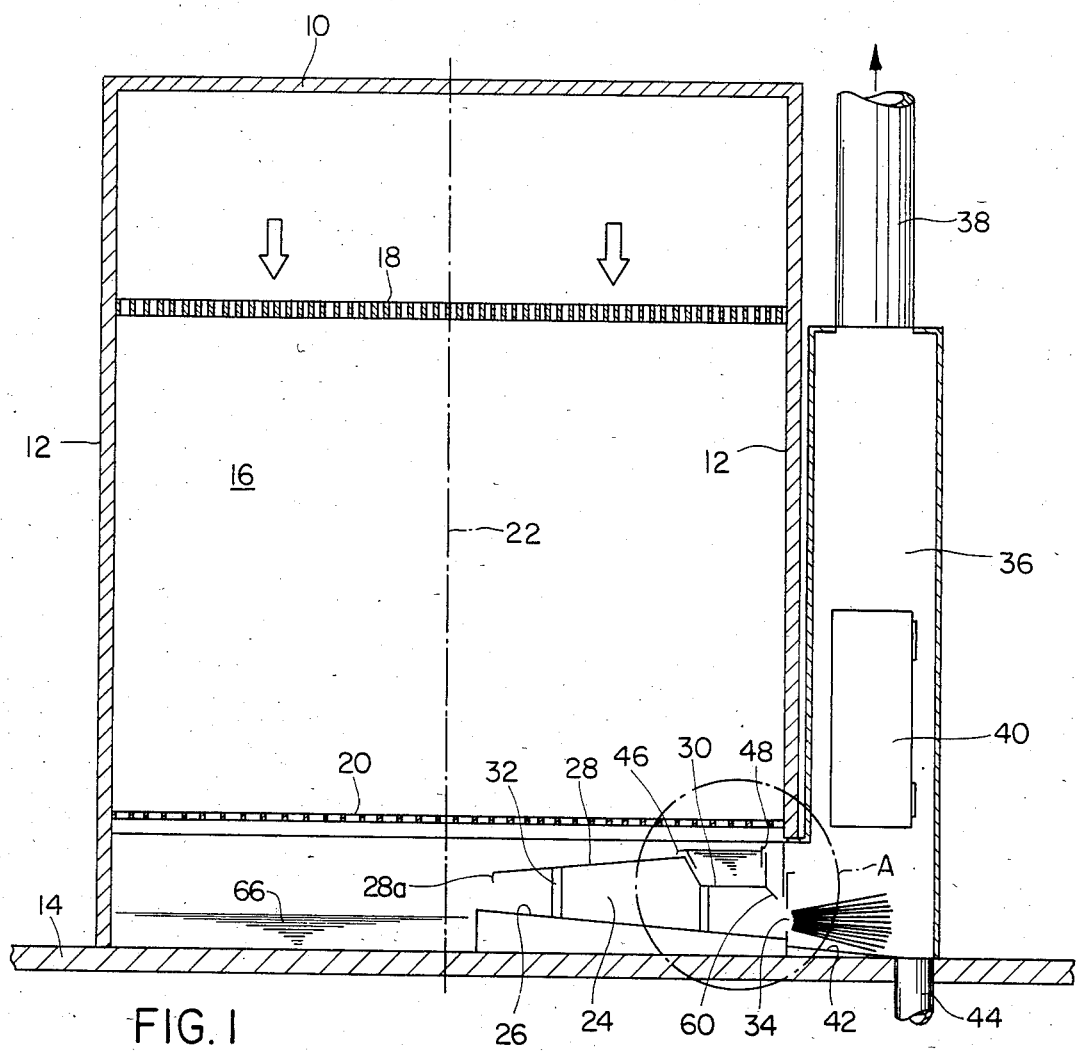
FIG. 1 is a vertical section, perpendicular to the direction in which articles to be treated pass through a treatment booth, embodying the invention.

In FIG. 1 a treatment booth has a roof 10 and two side walls 12 erected on the floor 14 of a building. A working space 16, provided inside the booth, is limited at the top by an intermediate ceiling 18 and at the bottom by an intermediate floor 20, both being in the form of gratings, so that conditioned fresh air, preferably circulated, purified and conditioned air, can be supplied to the working space 16 from above and extracted through the intermediate floor 20 at the bottom. The longitudinal centre plane of the treatment booth is denoted by chain dotted line 22 and this plane indicates the direction of movement through the booth of articles to be treated in the working space, for exampe, vehicle bodies.

Figures 1A, 2:
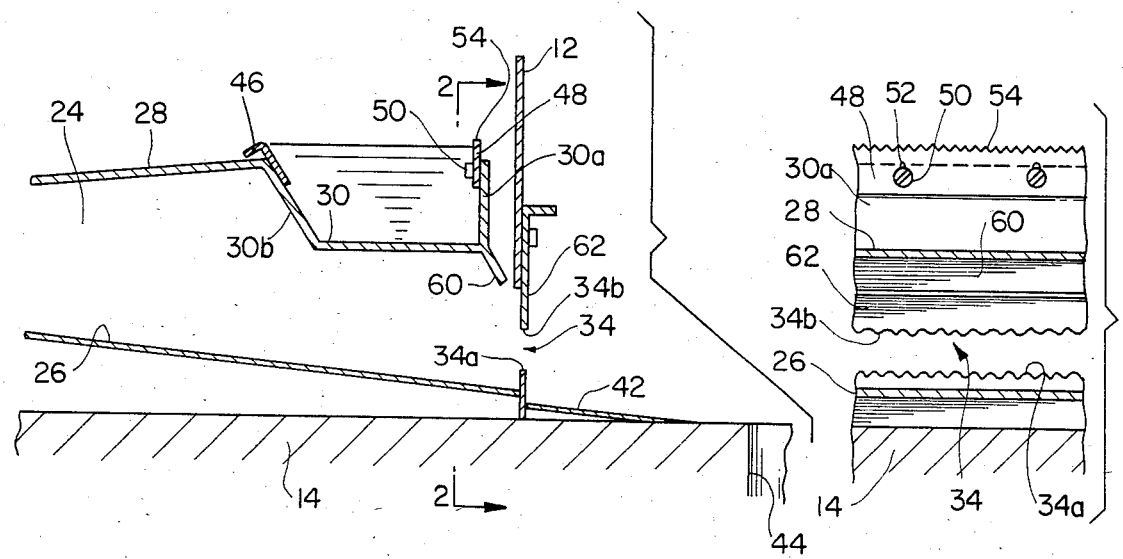
FIG. 1A shows the region identified by "A" in FIG. 1 on a larger scale than in FIG. 1.
FIG. 2 is a section along the line 2—2 in FIG. 1A.

Spent air from the working space 16 is extracted via a spent-air channel 24 (FIGS. 1 and 1A) defined by a channel bottom 26 and, at the top, by an intermediate wall 28 adjacent which is an overflow trough 30 extending in the longitudinal direction of the booth. The channel bottom 26 rests on the building floor 14. The intermediate wall 28 and the overflow trough 30 rest on legs 32 which are either supported on the channel bottom 26 or extend through channel bottom 26 and rest on the building floor 14. The spent-air channel 24 ends at a washing-out nozzle 34, beyond which is located an expansion chamber 36 leading into a spent-air stack 38. The spent air extracted via the stack 38, by means of a fan (not shown), is conditioned, if appropriate, and then supplied to the working space 16 again. A door 40 is located in the wall of the expansion chamber 36, and the bottom 42 of the expansion chamber, adjoining the washing-out nozzle 34, is drained via a drain pipe 44.

The washing-out nozzle 34 is in the form of a slit-shaped orifice which extends horizontally in the longitudinal direction of the treatment booth. As required, several such slit-shaped nozzle orifices can be arranged in series in this direction.

The overflow trough 30 has at each of its longitudinal edges, one or more weir elements 46 and 48 (FIGS. 1, 1A and 2) arranged in series and are vertically adjustable. To facilitate this adjustment, the side walls 30a, 30b of the overflow trough 30 have threaded holes, spaced apart longitudinally, for screws 50, and the weir elements have slots 52. The overflow edge 54 (FIG. 2) of the weir element 48 is serrated to keep impurities floating on the washing liquid away from the washing-out nozzle 34.

The overflow trough 30 is fed continuously by means not shown with washing liquid some of which flows over the weir element or elements 46 and rinses the top surface of the intermediate wall 28 inclined towards the longitudinal centre plane 22. From a flow-off edge 28a (FIG. 1) of intermediate wall 28, the washing liquid passes onto the channel bottom 26, rinses this and as a result of its inclination flows down to the lower edge 34a of washing-out nozzle 34. Edge 34 forms a weir. The washing liquid flowing over the weir element 48 is conveyed by a guide plate 60 to flow against a slide 62, the lower edge of which forms the upper edge 34b of the washing-out nozzle 34. Slide 62 is held against the side wall 12 of the booth so as to be vertically adjustable by means of screws and slots.

The spent air, extracted via the spent-air stack 38, at the washing-out nozzle 34 atomises the washing liquid with which the lower and upper edges 34a and 34b respectively of the washing-out nozzle 34 are fed, and behind the washing-out nozzle the liquid droplets formed in this way are swirled with the spent air, as a result of which the washing-out effect is obtained. The noise generated by the washing-out nozzle 34 is masked, in the direction of the working space 16, by the overflow trough 30 and the intermediate wall 28, as a result of which the noise level in the working space 16 can be reduced very considerably in comparison with conventional treatment booths with flat washing-out. The orifice edges of the washing-out nozzle 34, the lower edge 34a and the upper edge 34b, are corrugated, thus further increasing the washing-out effect. On the channel bottom 26 is a pool of washing liquid 66, fed continuously with washing liquid, which flows off via the channel bottom 26 and is atomised in the washing-out nozzle 34.

Because of the relatively high flow velocity of the spent air over the channel bottom 26 and because of the washing liquid flowing constantly over this, accumulations of paint or other impurities on the channel bottom 26 are prevented. The continuous rinsing of the edges of the washing-out nozzle 34 prevents accumulation of dirt there, and finally the expansion chamber bottom 42 is also rinsed continuously and the washing liquid occurring there is extracted immediately, so that paint or other impurities in the air cannot accumulate even in the expansion chamber 36. In addition, in the treatment booth according to the invention, the space on the far side of the washing-out nozzle 34 is readily accessible and therefore easy to clean, whilst accumulations of dirt cannot form in regions of the treatment booth which are not as readily accessible.

Figure 3:
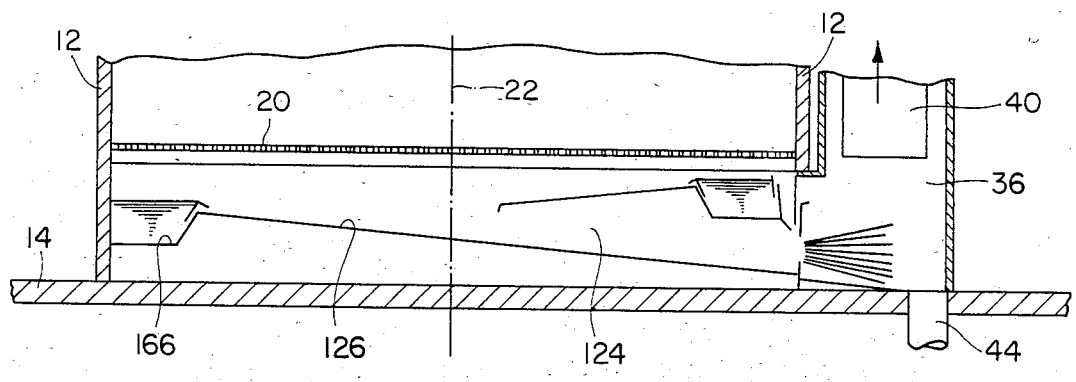
FIG. 3 is a vertical section similar to FIG. 1 through a further treatment booth embodying the invention.

In FIG. 3, the pool of washing liquid 66 of the first embodiment is replaced by an overflow trough 166, to which extends the bottom 126 of the spent-air channel 124.

We claim:

1. Treatment booth having a working space bounded by side walls and by a perforated floor underneath which is located:
   (a) an intermediate floor having a flow-off edge; and
   (b) washing-liquid reservoir adjacent said intermediate floor for rinsing said intermediate floor with washing-liquid;
   said flow-off edge on a side of said intermediate floor facing away from the washing-liquid reservoir;
   (c) a washing-out device for washing out particles or other impurities from spent air extracted from the working space through said perforated floor, said washing-out device having a slit-shaped nozzle orifice extending approximately horizontally and being limited by an upper edge and a lower edge; and
   (d) means for feeding said upper and said lower edge with washing-liquid, the improvement comprising:
      (i) a spent-air channel disposed underneath said intermediate floor and extending approximately horizontally from said flow-off edge over a distance of at least 20 cm to said nozzle orifice wherein said intermediate floor and said washing liquid reservoir are arranged to form a cover between the nozzle orifice and the working space for shielding the working space against noise generated at the nozzle orifice;
      (ii) an expansion chamber adjoining the nozzle orifice, said expansion chamber being disposed outside the side walls of the working space, and extending in a substantially vertical direction;
      (iii) means for providing access to said nozzle and said expansion chamber for cleaning and maintenance; and
      (iv) a washing-liquid guide channel is provided, said guide channel extending directly from said reservoir to said nozzle orifice, bypassing said intermediate floor, for providing the washing-liquid to said nozzle orifice.

2. Booth as claimed in claim 1, wherein said guide channel leads to the upper edge of the nozzle orifice.

3. Booth as claimed in claim 1, characterized by means for feeding the bottom of said spent-air channel with washing-liquid.

4. Booth as claimed in claim 1, wherein at least one of said edges of the nozzle orifice is adjustable vertically for varying the gap of the nozzle orifice.

5. Booth as claimed in claim 1, wherein said reservoir is in the form of an overflow trough adjoining said intermediate floor, said trough having longitudinal side walls at least one of which is provided with a vertically adjustable weir element for adjusting the supply of washing-liquid to said guide channel.

6. Booth as claimed in claim 5, wherein said weir element has a serrated overflow edge.

* * * * *